July 21, 1959    E. G. SUNDBERG    2,896,006
COVER FOR ELECTRODES IN GALVANIC CELLS
Filed May 14, 1956
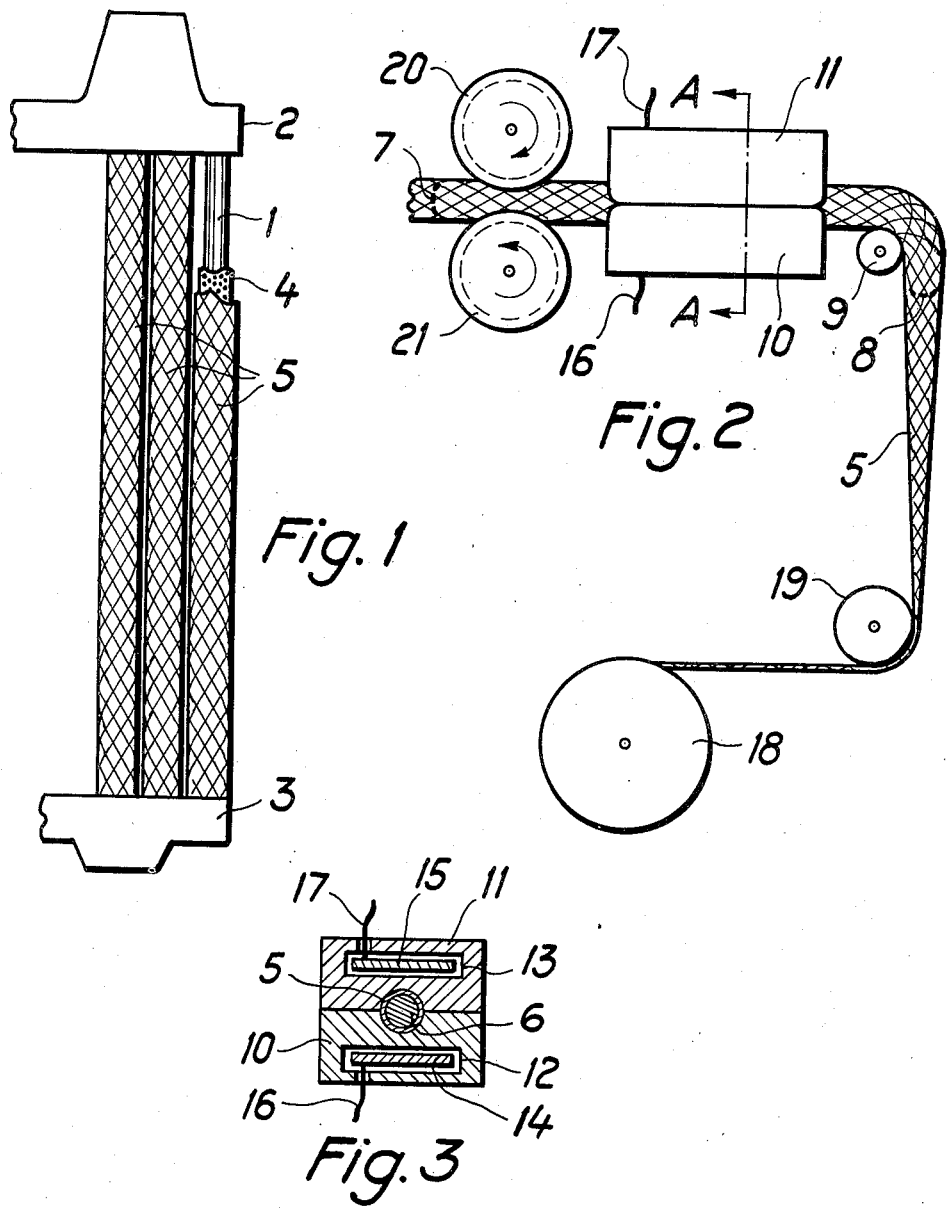
INVENTOR
ERIK GUSTAV SUNDBERG
BY Strauch, Nolan & Neale
ATTORNEYS

United States Patent Office 2,896,006
Patented July 21, 1959

2,896,006

COVER FOR ELECTRODES IN GALVANIC CELLS

Erik Gustav Sundberg, Nol, Sweden, assignor to Aktiebolaget Tudor, Stockholm, Sweden, a Swedish joint-stock company Application May 14, 1956, Serial No. 584,780

5 Claims. (Cl. 136—43)

The present invention relates to covers for the electrode rods of electrodes of the kind known as tube plates which are used in galvanic cells and especially in accumulators of the lead-acid type. A tube plate consists of a number of vertical rods of conductive material which are interconnected by horizontal transverse connecting members which are also made of conductive material and preferably of the same material as the rods. Each of the vertical rods is surrounded by a layer of distintegrable mass of active material, the active material being in turn surrounded by a tubular cover of insulating material which is permeable to the accumulator electrolyte. The main purpose of this cover is to hold the active material in its place on the rod of conductive material.

Hitherto the said tubular covers have usually consisted of slotted or perforated tubes of hard rubber or of sleeves of woven, knitted or braided fibrous material, e.g. glass wool. It has proved that the hard rubber tubes are not sufficiently resistant against breaking, and due to the stiffness of the hard rubber material they are not sufficiently resilient under the pressure of the active material, nor do they adapt themselves to the external configuration of the active material when the latter swells after having been in use in the accumulator for some time. Furthermore the hard rubber tubes suffer from the drawback that particles of active mass may escape through the slots or perforations and form deposits which may cause internal short circuits in the accumulator. Covers in the form of sleeves of fibrous material as hitherto employed, on the other hand, do not possess satisfactory stability and strength.

In U.S. Patent No. 2,747,007 there is described a tube plate in which the tubular cover of each electrode rod consists of an external thin-walled perforated tube of a plastic, e.g. a vinyl polymer, with an internal coating of flexible porous fabric of glass fibre threads. This cover has proved to be superior to other covers hitherto known as regards physical properties and ability to retain the active material.

It is the object of the present invention to provide a cover for electrode rods which affords all the advantages of the cover disclosed in the said U.S. patent and besides has a still less wall thickness so that for a given external diameter of the cover the greatest possible quantity of active material can be contained within the cover whereby the capacity per volume unit of the accumulator is increased.

According to the invention the cover consists of a woven, knitted or braided hose of electrolyte resistant insulating fibrous material, part of said fibrous material consisting of a plastic, e.g. polyvinyl chloride, and the rest of the said fibrous material consisting of a material not being fusible at the same temperature as the plastic material, in which the fibres of plastic have been fused so as to be bound to each other. The said material not being fusible at the same temperature as the plastic preferably consists of mineral or glass fibres. The cover according to the invention has a great stiffness and stability, since the fusing procedure to which the plastic fibres have been subjected not only causes the plastic fibres to be bound to each other but also makes the plastic material bind, at least to a certain extent, the fibres of the other fibrous material to each other. The cover according to the invention also has a high permeability to the electrolyte and can be made with an extremely small wall thickness.

The invention will be described more in particular in conjunction with the accompanying drawing.

Figure 1 shows part of a tube plate in which the electrode rods are provided with covers according to the invention.

Figure 2 shows schematically the essential parts of an apparatus for carrying out a step in the manufacture of a cover according to the invention.

Figure 3 shows a cross section taken along line A—A in Figure 2.

The tube plate shown in Figure 1 comprises a number of vertical rods 1 which are interconnected by a top bar 2 and a bottom bar 3. The rods 1 and the bars 2 and 3 are made of conductive material, e.g. lead. Each of the rods 1 is surrounded by a layer of active material 4. The active material on each rod is surrounded by a cover 5. According to the invention the cover 5 consists of a woven, knitted or braided hose or fabric of electrolyte resistant insulating fibrous material part of which consists of a plastic e.g. polyvinyl-chloride and part of which consists of mineral or glass fibres or other material not being fusible at the same temperature as the plastic. The hose or fabric has been subjected to a heat treatment so that the plastic fibres have been fused or welded to each other.

If the hose or fabric is manufactured by weaving the fibrous material, the warp should comprise both threads of plastic and threads of the other material, e.g. mineral or glass wool fibres, whereas the weft should preferably consist of threads of plastic only.

In the case that the hose or fabric is manufactured by knitting, a thread consisting of plastic fibres and fibres of the other material stranded together may be used.

The simplest method of manufacturing the hose or fabric is perhaps braiding in which case some of the thread spindles of the braiding machine should carry thread of plastic while the other spindles carry thread of the other material, e.g. glass fibre thread.

The ratio of the amount of plastic fibres to the amount of fibres of the other material may vary within wide limits. It should be noted however that the greater the proportion of plastic fibres is, the greater will be the stiffness and the less the porosity of the finished cover. Therefore the proportion of plastic fibres should be large enough to give the cover the desired stiffness but not so large that the porosity of the cover becomes so low that the passage of electrolyte through the cover is impeded.

The hose manufactured by weaving, knitting or braiding is subjected to a heat treatment before it is applied to the electrode rods in order to cause a fusion or welding of the fibres of plastic material at least at the points where they cross each other. An apparatus for performing this heat treatment is shown schematically in Figures 2 and 3. The apparatus comprises a mandrel 6 having a circular cross section with a diameter equal to or slightly less than the desired internal diameter of the hose 5. In Figure 2 wherein the mandrel is shown covered by the hose 5, the ends of the mandrel are indicated by dotted lines 7 and 8. At one end mandrel 6 is bent at right angles and the bent portion of the mandrel rests against a pulley 9 which serves to prevent the mandrel from being displaced in longitudinal direction. The main part of mandrel 6 is positioned between two cheeks 10 and 11 each having a semi-cylindrical groove in the surface facing the other cheek as will be seen from Figure 3. When the cheeks are pressed against each other these grooves form a cylindrical channel with a diameter somewhat greater than that of the mandrel. In each of cheeks 10 and 11 there is a cavity 12 and 13 respectively which contains an electric heating element 14 and 15 respectively. Current feed conductors for these heating elements are indicated by 16 and 17. The hose 5 is taken from a supply reel 18 over a guiding pulley 19 and slipped over the mandrel at end 8 and passed between cheeks 10 and 11. The hose is then continuously moved along the mandrel by means of two pulleys 20 and 21 rotating with the same speed in the directions indicated by the arrows. Heat is applied to cheeks 10 and 11 by means of heating elements 14 and 15 so that the hose 5 while passing between the cheeks is heated to a temperature sufficiently high to make the fibres of plastic fuse. By applying more or less heat the fusion may be made more or less complete. The heating may be carried so far that the fibres of plastic are wholly liquefied in which case the plastic after having solidified effectively binds the fibres of the other material to each other.

During the heat treatment the hose should preferably also be subjected to pressure. It will be understood that the mandrel 6 and cheeks 10 and 11 can be so dimensioned that they exert a pressure on the hose.

After the heat treatment the hose is cut into pieces of suitable length.

The method and apparatus described above for applying heat to the hose is given by way of example only, and the heat treatment can be carried out by other methods and means obvious to those skilled in the art.

Before the covers are applied to the electrode they may be impregnated with a dressing size, starch or similar agent which is soluble in the electrolyte of the galvanic cell. The purpose of this impregnation is to make the covers stiff to facilitate their handling when they are applied to the electrode.

I claim:

1. In an accumulator electrode comprising a plurality of parallel rods of conductive material, active material surrounding said rods, and improved covers surrounding said active material to retain the active material on said rods, said improved covers consisting of a fabric of threads, part of said threads being of a fusible plastic and part of said threads being of a fibrous material, said plastic parts crossing each other and being fusible at a temperature lower than any temperature at which the threads of said fibrous material may be fusible to be bound to each other at said crossing points.

2. In an accumulator electrode comprising a plurality of parallel rods of conductive material, active material surrounding said rods, and improved tube-shaped covers surrounding said active material to retain it on said rods, said covers consisting of a fabric of threads part of which are of a thermo-plastic material and part of which are of a material selected from the class consisting of mineral fibres and glass fibres being fusible at a temperature higher than the temperature at which said thermo-plastic material is fusible, the threads of said plastic material crossing each other and being fused at their crossing points.

3. An accumulator electrode comprising a plurality of parallel rods of conductive material, active material surrounding said rods, and tube-shaped covers surrounding said active material to retain it on said rods, each of said covers consisting of a fabric of threads part of which consists of polyvinyl chloride and part of which consists of glass fibres, the threads of polyvinyl chloride crossing each other and being bound at their crossing points.

4. A method of manufacturing a tube-shaped cover for active material in an accumulator electrode of the tube-plate type, comprising the steps of forming a sleeve from crossed threads of plastic and of threads of a fibrous material, the threads of said plastic material being fusible at a temperature lower than any temperature at which the threads of said fibrous material are fusible, and heating said sleeve to fuse together the threads of plastic at their crossing points.

5. The method as claimed in claim 4 comprising the step of applying pressure to said sleeve concomitantly with said heating step.

References Cited in the file of this patent
UNITED STATES PATENTS

| | | |
|---|---|---|
| 424,575 | Reed | Apr. 1, 1890 |
| 2,176,428 | Kershaw | Oct. 17, 1939 |
| 2,305,121 | Wheat | Dec. 15, 1942 |
| 2,350,752 | Graf | June 6, 1944 |
| 2,373,281 | White | Apr. 10, 1945 |
| 2,420,456 | White | May 13, 1947 |